US 8,886,783 B2

(12) United States Patent
Johnsen et al.

(10) Patent No.: US 8,886,783 B2
(45) Date of Patent: Nov. 11, 2014

(54) SYSTEM AND METHOD FOR PROVIDING SECURE SUBNET MANAGEMENT AGENT (SMA) BASED FENCING IN AN INFINIBAND (IB) NETWORK

(75) Inventors: Bjørn-Dag Johnsen, Oslo (NO); Line Holen, Fetsund (NO); Dag Georg Moxnes, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 43 days.

(21) Appl. No.: 13/488,005

(22) Filed: Jun. 4, 2012

(65) Prior Publication Data

US 2012/0311122 A1 Dec. 6, 2012

Related U.S. Application Data

(60) Provisional application No. 61/493,330, filed on Jun. 3, 2011.

(51) Int. Cl.
*G06F 15/16* (2006.01)
*H04L 29/06* (2006.01)
*H04L 9/32* (2006.01)

(52) U.S. Cl.
CPC .......... *H04L 63/0442* (2013.01); *H04L 9/3271* (2013.01); *H04L 63/083* (2013.01); *H04L 9/3234* (2013.01); *H04L 63/0876* (2013.01)
USPC ........................................................ 709/223

(58) Field of Classification Search
CPC .................................................. H04L 49/358
USPC ........................................ 709/223, 224, 253

See application file for complete search history.

(56) References Cited

U.S. PATENT DOCUMENTS

| 5,805,805 | A | 9/1998 | Civanlar et al. |
| 6,463,470 | B1 | 10/2002 | Mohaban et al. |
| 6,647,419 | B1 | 11/2003 | Mogul |
| 6,678,835 | B1 | 1/2004 | Shah et al. |
| 6,748,429 | B1 | 6/2004 | Talluri et al. |

(Continued)

FOREIGN PATENT DOCUMENTS

| EP | 2 051 436 A1 | 4/2009 |
| EP | 2160068 A1 | 3/2010 |
| WO | 01/90838 A2 | 11/2001 |
| WO | 2012037518 | 3/2012 |

OTHER PUBLICATIONS

International Search Report dated Sep. 23, 2013 for Application No. PCT/US2013/040639, 10 pages.

(Continued)

*Primary Examiner* — Wing F Chan
*Assistant Examiner* — Andrew Woo
(74) *Attorney, Agent, or Firm* — Meyer IP Law Group

(57) ABSTRACT

A system and method can use a secure subnet management agent (SMA) to perform fencing operations in an InfiniBand (IB) fabric. A host channel adapter (HCA) in the fabric can be associated with a plurality of ports, wherein the HCA operates to implement a SMA in its embedded firmware. Furthermore, the SMA operates to be used as a proxy, by a port on the HCA, for updating one or more states associated with another port on the HCA. The one or more states are associated with at least one of updating a management key and resetting a link at another port on the HCA.

18 Claims, 3 Drawing Sheets

(56) References Cited

U.S. PATENT DOCUMENTS

| | | |
|---|---|---|
| 6,941,350 B1 | 9/2005 | Frazier et al. |
| 6,963,932 B2 | 11/2005 | Bhat |
| 6,978,300 B1 | 12/2005 | Beukema et al. |
| 6,981,025 B1 | 12/2005 | Frazier et al. |
| 6,985,956 B2 | 1/2006 | Luke et al. |
| 7,069,468 B1 | 6/2006 | Olson |
| 7,185,025 B2 | 2/2007 | Rosenstock et al. |
| 7,200,704 B2 | 4/2007 | Njoku et al. |
| 7,216,163 B2 | 5/2007 | Sinn |
| 7,231,518 B1 | 6/2007 | Bakke |
| 7,290,277 B1 * | 10/2007 | Chou et al. ............ 726/3 |
| 7,302,484 B1 | 11/2007 | Stapp et al. |
| 7,356,841 B2 | 4/2008 | Wilson et al. |
| 7,398,394 B1 | 7/2008 | Johnsen et al. |
| 7,409,432 B1 | 8/2008 | Recio et al. |
| 7,437,447 B2 | 10/2008 | Brey et al. |
| 7,493,409 B2 * | 2/2009 | Craddock et al. ......... 709/238 |
| 7,500,236 B2 | 3/2009 | Janzen |
| 7,633,955 B1 | 12/2009 | Saraiya et al. |
| 7,634,608 B2 | 12/2009 | Droux et al. |
| 7,685,385 B1 | 3/2010 | Choudhary et al. |
| 7,724,748 B2 | 5/2010 | Davis |
| 7,783,788 B1 | 8/2010 | Quinn et al. |
| 7,843,822 B1 | 11/2010 | Paul et al. |
| 7,860,961 B1 | 12/2010 | Finkelstein et al. |
| 7,873,711 B2 | 1/2011 | Adams et al. |
| 8,291,148 B1 | 10/2012 | Shah et al. |
| 8,327,437 B2 | 12/2012 | McAlister |
| 8,331,381 B2 | 12/2012 | Brown et al. |
| 8,335,915 B2 | 12/2012 | Plotkin et al. |
| 8,423,780 B2 | 4/2013 | Plotkin et al. |
| 8,549,281 B2 | 10/2013 | Samovskiy et al. |
| 8,583,921 B1 | 11/2013 | Shu |
| 2002/0059597 A1 | 5/2002 | Kikinis et al. |
| 2002/0120720 A1 | 8/2002 | Moir |
| 2003/0009487 A1 | 1/2003 | Prabakaran et al. |
| 2003/0093509 A1 | 5/2003 | Li et al. |
| 2003/0105903 A1 | 6/2003 | Garnett et al. |
| 2003/0120852 A1 | 6/2003 | McConnell et al. |
| 2003/0208572 A1 | 11/2003 | Shah et al. |
| 2004/0199764 A1 | 10/2004 | Koechling et al. |
| 2004/0220947 A1 | 11/2004 | Aman et al. |
| 2004/0249928 A1 | 12/2004 | Jacobs et al. |
| 2005/0044363 A1 | 2/2005 | Zimmer et al. |
| 2005/0071709 A1 | 3/2005 | Rosenstock et al. |
| 2005/0091396 A1 | 4/2005 | Nilakantan et al. |
| 2005/0105554 A1 | 5/2005 | Kagan et al. |
| 2005/0182853 A1 | 8/2005 | Lewites et al. |
| 2005/0198164 A1 | 9/2005 | Moore et al. |
| 2005/0198250 A1 | 9/2005 | Wang |
| 2005/0213608 A1 | 9/2005 | Modi et al. |
| 2005/0273641 A1 | 12/2005 | Sandven et al. |
| 2006/0079278 A1 | 4/2006 | Ferguson et al. |
| 2006/0195560 A1 | 8/2006 | Newport |
| 2007/0206735 A1 | 9/2007 | Silver et al. |
| 2008/0031266 A1 | 2/2008 | Tallet et al. |
| 2008/0144614 A1 | 6/2008 | Fisher et al. |
| 2008/0183853 A1 | 7/2008 | Manion et al. |
| 2008/0229096 A1 | 9/2008 | Alroy et al. |
| 2008/0250125 A1 | 10/2008 | Brey et al. |
| 2009/0049164 A1 | 2/2009 | Mizuno |
| 2009/0327462 A1 | 12/2009 | Adams et al. |
| 2010/0138532 A1 | 6/2010 | Glaeser et al. |
| 2010/0142544 A1 | 6/2010 | Chapel et al. |
| 2010/0166167 A1 | 7/2010 | Karimi-Cherkandi et al. |
| 2010/0306772 A1 | 12/2010 | Arnold et al. |
| 2011/0072206 A1 | 3/2011 | Ross et al. |
| 2011/0110366 A1 | 5/2011 | Moore et al. |
| 2011/0209202 A1 | 8/2011 | Otranen |
| 2011/0222492 A1 | 9/2011 | Borsella et al. |
| 2012/0195417 A1 | 8/2012 | Hua et al. |
| 2012/0290698 A1 | 11/2012 | Alroy et al. |
| 2013/0138836 A1 | 5/2013 | Cohen et al. |
| 2013/0159865 A1 | 6/2013 | Smith et al. |

OTHER PUBLICATIONS

International Search Report dated Sep. 26, 2013 for Application No. PCT/US2013/040656, 10 pages.

InfiniBand$^{SM}$ Trade Association, InfiniBand™ Architecture Specification, vol. 1, Release 1.2.1, Nov. 2007, pp. 1-1727.

Aurelio Bermudez, On the InfiniBand Subnet Discovery Process, IEEE the Computer Society 2003, pp. 1-6.

Tom Shanley, Infiniband Network Architecture, Pearson Education 2002, p. 559, 561.

Shanley, Tom, Infiniband Network Architecture (excerpt), Pearson Education, published 2002, p. 209-211, 393-394, 551, 554.

Lee, M., Security Enhancement in Infiniband Architecture, IEEE, vol. 19, Apr. 2005, pp. 1-18.

European Patent Office, International Searching Authority, International Search Report and Written Opinion dated Sep. 12, 2012 for International Application No. PCT/US2012/040775, 13 pages.

\* cited by examiner

SYSTEM AND METHOD FOR PROVIDING SECURE SUBNET MANAGEMENT AGENT (SMA) BASED FENCING IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

CROSS REFERENCE TO RELATED APPLICATIONS

This application is related to the following patent application, which is hereby incorporated by reference in its entirety:

U.S. patent application Ser. No. 13/487,973, entitled "SYSTEM AND METHOD FOR PROVIDING SECURE SUBNET MANAGEMENT AGENT (SMA) IN AN INFINIBAND (IB) NETWORK", by inventors Bjørn Dag Johnsen, Ola Tørudbakken and David Brean, filed Jun. 4, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can use a secure subnet management agent (SMA) to perform fencing operations in an InfiniBand (IB) fabric. A host channel adapter (HCA) in the fabric can be associated with a plurality of ports, wherein the HCA operates to implement a SMA in its embedded firmware. Furthermore, the SMA can be used as a proxy, by a port on the HCA, for updating one or more states associated with another port on the HCA. Said one or more states can be associated with at least one of updating a management key and resetting a link at another port on the HCA.

DETAILED DESCRIPTION

Described herein is a system and method that can provide secure subnet management agent (SMA) based fencing in an interconnected network, such as an InfiniBand (IB) network.

Figure 1:
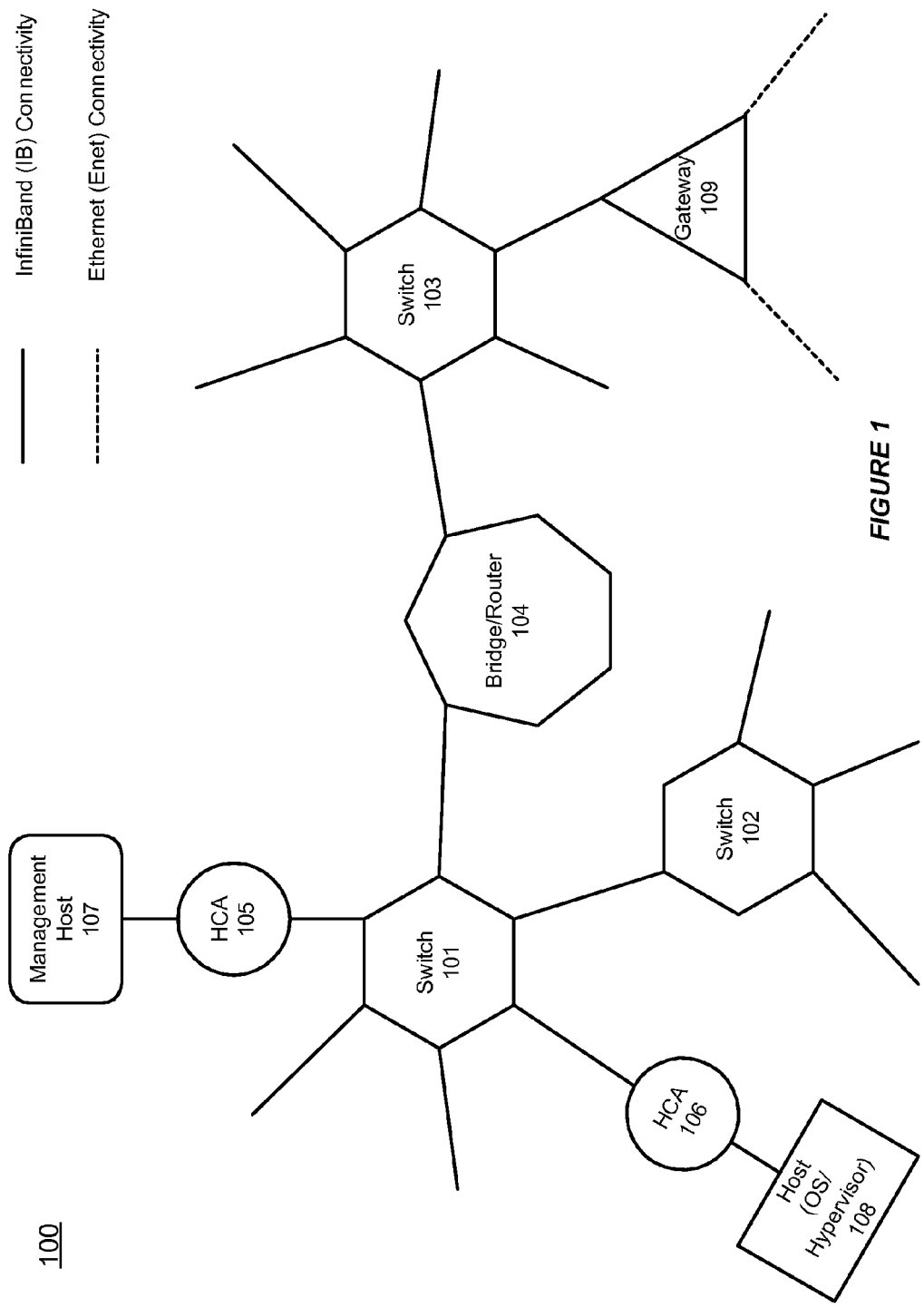
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 an be installed with HCAs 105-106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can only be indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 48151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Subnet Management Agent (SMA) Based Fencing

In accordance with an embodiment of the invention, a secure HCA SMA can support the fencing of one or more HCA ports from other HCA ports. For example, the SM and/or other fabric management entity can control the fencing of a lost leaf switch connecting to a HCA port via another part of the fabric that connects to another HCA port.

Figure 2:
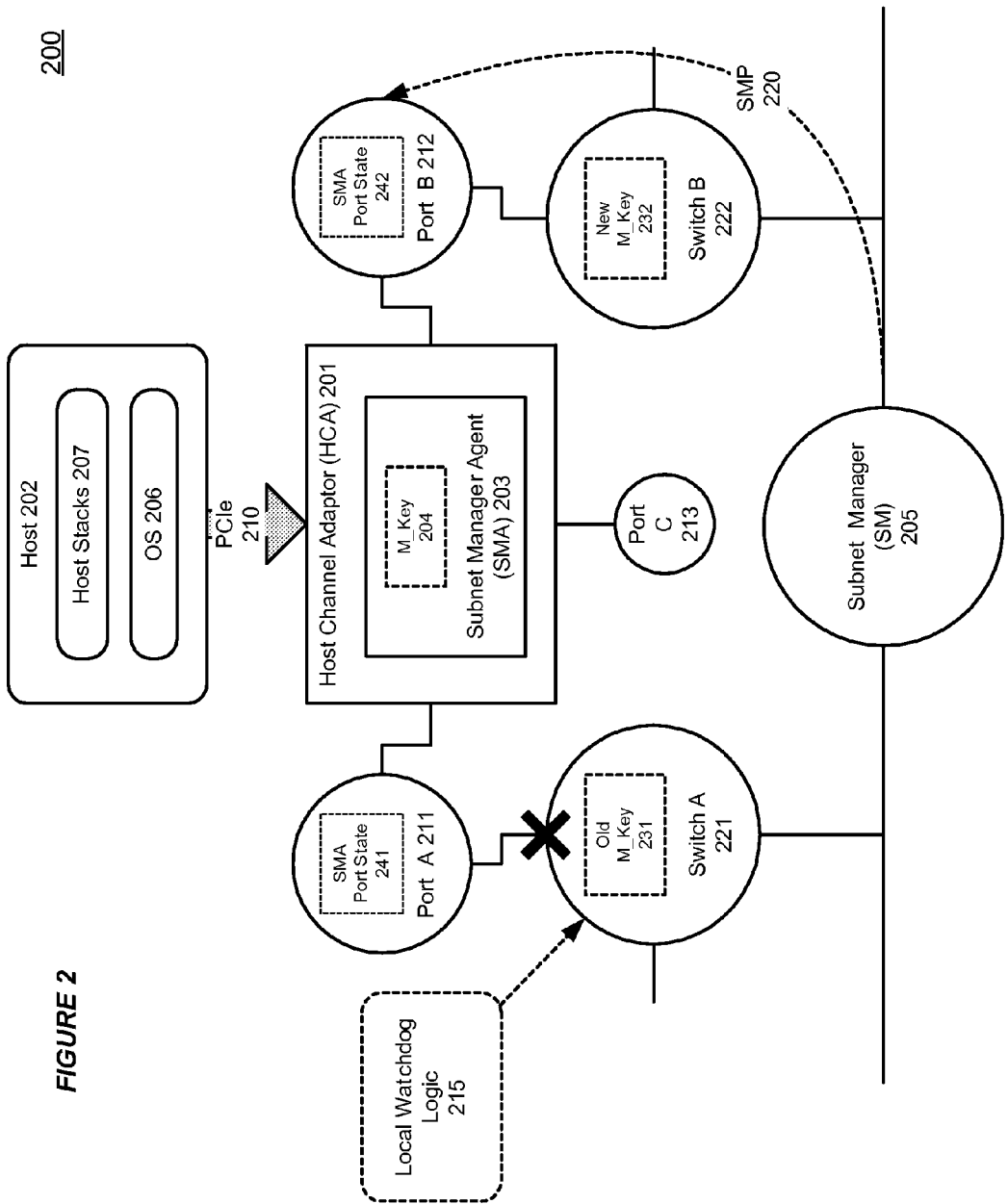
FIG. 2 shows an illustration of using a secure subnet management agent (SMA) to support fencing in an IB fabric in accordance with an embodiment of the invention.

FIG. 2 shows an illustration of using a secure HCA SMA to support fencing in an IB fabric in accordance with an embodiment of the invention. As shown in FIG. 2, an HCA 201 in an IB fabric 200 can have multiple ports A-C 211-213. A host 202 can access the HCA 201 via a connection, e.g. via a peripheral component interconnect express (PCIe) connection 210. Furthermore, each of the ports A-C 211-213 can connect to a different leaf switch, e.g. port A 211 can connect to a leaf switch A 221 and port B 212 can connect to another leaf switch B 222.

A SM 205 in the fabric 200 can detect that a leaf switch chip on the switch A 221 may enter an inactive state (see "X" in FIG. 2), in which case the switch A 221 can only forward packets based on current routing and partitioning policies. It may not be possible to change the state associated with the switch A 221, e.g. via an in-band management interface, when the switch A 221 is in an inactive state. Also, it may not be possible for the fabric 200 to change the partitioning policies for the directly connected hosts (e.g. host 202) before a local watchdog logic 215 can recover the state of the leaf switch A 221 by resetting the system on the switch A 221.

In order to avoid dependency on the host software 206-207, fabric based management software, e.g. the SM 205, can use the SMA 203 associated with HCA port B 212 as a proxy for updating the states on the HCA port A 211. Such state updates on the HCA port A 211 can support various fabric management and maintenance operations, such as updating M_Key 204 in the SMA 203 and/or resetting a link on the HCA port A 211.

In an example, the fabric 200 was associated with an old M_key 231 before the leaf switch A 221 goes into the inactive state or is lost. Then, after the leaf switch 221 goes into the inactive state or is lost, the fabric 200 can update the M_key to a new M_Key 232. Since the leaf switch A 221 is in an inactive state, the leaf switch A 221 may not be aware of the new M_Key 232 and may continually use the old M_Key 231.

As shown in FIG. 2, the leaf switch A 221 prevents the SM 206 from accessing the directly connected HCA ports, e.g. port A 211, so that the SM 206 may not update the state of those ports, e.g. SMA port state 241 for port A 211. Then, the partitioning policy currently implemented by port A 211 and the leaf switch A 221 may be in a stale state relative to the current policy, which the SM 206 wants to apply.

A new partitioning policy can be applied to prevent the scenario where the hosts with HCA ports connected to the lost/inactive leaf switch, e.g. host 202, can communicate according to the old policy. This scenario can be the result that the switch forwarding logic is fully operational while the switch embedded management logic is not operational. Also, this scenario can be the result that the SM 205 associated with the lost/inactive switch 221 can perform re-initialization of the switch 221 and the directly connected HCA ports 211 with stale partitioning policy, before the SM 205 becomes aware of a new master SM with a new policy. The re-initialization scenario may happen in the case when the switch 221 is reset by the local watchdog 215, and the training of links associated with switch ports that connect to the rest of the fabric (and the new master SM) takes a longer time than the training of the switch-port to the HCA-port links.

Furthermore, in an IB fabric 200, each HCA port 211-213 may be connected to a different subnet, each of which may be associated with a different set of subnet managers. A HCA 201 can have a logical SMA instance 203 associated with each port, and this SMA instance 203 can be accessed from the IB fabric 200 only using SMPs 220 via the local ports 211-212. This prevents a SM from interfering with the state of a HCA port that is not part of its subnet.

As shown in FIG. 2, when two or more ports 211-213 of a HCA 201 are connected to the same subnet 200, the above restriction may represent an obstacle for providing highly available access to all SMA/port instances in the subnet from any current master SM 205 in the local subnet 200. The state 241 of an HCA port 211, which connects to a leaf switch 221 with an unknown state, may need to be controlled independently of the local host 202 that the HCA 201 is associated with in order for the fabric implementation to be able to guarantee that no pair of hosts are able to communicate based on stale or incorrect partitioning policies (e.g. in the case where the rest of the fabric is being updated with new such policies).

A policy can allow an HCA 201 implementation to receive SMP request 220 on a port B 212 that specifies an update of the state of another port A 211 on the same HCA 201. This policy option may be disabled by default, and can then be turned on for each port by the SM 205 when the SM 205 detects that it controls two or more ports on the same HCA. Furthermore, the SM 205 can make sure that a port 211 can be controlled from another port 212 on the same HCA 201, which the SM 205 already controls. Also, the SM 205 can ensure that no SM can "hijack" an HCA port that does not belong to the same subnet in the first place. This can be accomplished by only allowing such operations when both ports have the same current M_Key value, or by using special SMP requests that includes the M_Key for both the involved HCA ports 211-212. The second approach avoids any race conditions when updating the current M_Key for either involved port.

A set of operations that support to update the M_Key value and to reset the port can ensure that a SM instance 205 associated with the failed leaf switch 221 may not be able to accidentally set up the HCA port 211 with stale policy, and can make sure that the host 202 is prevented from continuing to communicate using a stale policy via the leaf switch 221 with an unknown state.

Additionally, the SMA operations associated with any port can be available from another port on the same HCA, as long as the SMA 203 has been enabled in a secure way. With this scheme, a SM 205 can control different aspects of all ports and can then update the other port with the current policy, and, thereby, also allow the other port to remain operational even without knowing the state of the associated leaf switch.

As shown in FIG. 2, the SM 205 can use the SMA 203 associated with HCA port B 212 as a proxy to update the states on the HCA port A 211 and perform fencing operations that can prevent the leaf switch A 221 from trying to perform a subnet operation and/or management tasks using the old M_key 231.

In accordance with an embodiment of the invention, a HCA 201 in an IB fabric 200 can have multiple ports that are connected to leaf switches in the inactive state. The HCA SMA 203 can implement the full SMA features set on behalf of any number of its local ports. As shown in FIG. 2, the HCA port B 212 can function as a proxy for updating the states on both the HCA port A 211 and HCA port C 213, when it is necessary.

Figure 3:
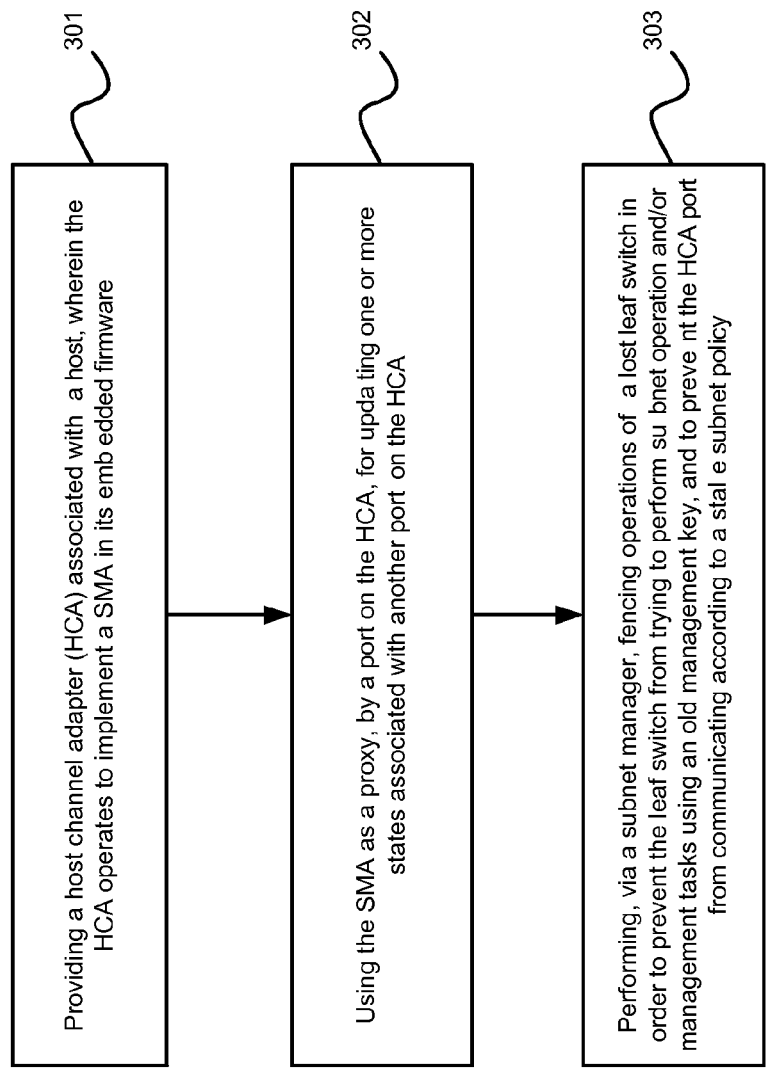
FIG. 3 illustrates an exemplary flow chart for using a secure HCA SMA to support fencing in an IB fabric in accordance with an embodiment of the invention.

FIG. 3 illustrates an exemplary flow chart for using a secure HCA SMA to support fencing in an IB fabric in accordance with an embodiment of the invention. As shown in FIG. 3, at step 301, a host channel adapter (HCA) in an IB fabric can be associated with a host, wherein the HCA operates to implement a SMA in its embedded firmware. Then, at step 302, the SMA can be used as a proxy, by a port on the HCA, for updating one or more states associated with another port on the HCA. Here, the one or more states can be associated with at least one of updating a management key and resetting a link at another port on the HCA. Finally, at step 303, the subnet manager can perform fencing operations against a lost leaf switch in order to prevent the leaf switch from trying to perform subnet operation and/or management tasks using an old management key. Furthermore, the fencing operations can also prevent the HCA port from communicating according to a stale subnet policy.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system using a secure subnet management agent (SMA) in an InfiniBand (IB) fabric, comprising:
    a host channel adapter (HCA) having an embedded firmware and a plurality of ports, including at least a first port having a first port state and a second port having a second port state, wherein each of the plurality of ports is connected to a different leaf switch;
    a secure subnet management agent (SMA) implemented in the embedded firmware of the HCA;
    wherein the SMA is configured to operate as a proxy such that if the first port of the HCA is unable to receive a subnet management packet (SMP) from a subnet manager (SM) via a leaf switch connected directly to the first port, the SMA is configured to receive the SMP from the SM via the second port of the HCA and update the first port state of the first port in response to the SMP; and
    wherein the SMA is further configured to operate as a proxy such that, if the leaf switch connected directly to the first port of the HCA enters an inactive state in which it is not possible to change one or more states associated with said leaf switch via an in-band management interface, the SMA is configured to receive an SMP from the SM via the second port of the HCA and update said one or more states of said leaf switch in response to the SMP.

2. The system according to claim 1, further comprising:
    a local watchdog logic component that can be used to recover the leaf switch connected directly to the first port via resetting a local system.

3. The system according to claim 1, wherein:
    updating said first port state of the first port in response to the SMP is associated with at least one of updating a management key and resetting a link at the first port on the HCA.

4. The system according to claim 1, further comprising:
    a subnet manager that operates to update the fabric with a new management key, which replaces an old management key that was associated with the fabric before a leaf switch connected to a port is lost.

5. The system according to claim 4, wherein:
    the subnet manager can perform fencing operations for the first port against a lost leaf switch via the second port in order to
        prevent the lost leaf switch from trying to perform subnet operation and/or management tasks that represents stale subnet policy using the old management key, and
        prevent the HCA port from communicating according to stale subnet policy.

6. The system according to claim 5, wherein:
    the subnet manager operates to update the first port with the new management key using the SMA on the HCA.

7. The system according to claim 1, wherein:
    the SMA operates to
        support carrying out subnet management packet (SMP) based fence operation on a remote HCA port, and wherein a fence operation includes updating the M_Key associated with the remote port as well as resetting the link associated with the remote port, and implement full SMA features set on behalf of any of the plurality of ports of the HCA in which said SMA is embedded, wherein the ability to perform any SMA operation allows the SM to configure the first port according to a current fabric policy without any dependency on direct IB access to the the first port.

8. The system according to claim 1, wherein:
the HCA is operable to ensure that SMA operations via one HCA port on behalf of another HCA port are only allowed when both ports are controlled by a same subnet manager, which is assured by requiring at least one of that both ports are set up with a same M_Key value and that the M_Key value for each port is specified in each operation request.

9. A method for using a secure SMA in an Infiniband (IB) fabric, the method comprising:
providing a host channel adapter (HCA) having an embedded firmware and a plurality of ports, including at least a first port having a first port state and a second port having a second port state, wherein each of the plurality of ports is connected to a different leaf switch;
providing a secure subnet management agent (SMA) implemented in the embedded firmware of the HCA;
providing a first proxy function with said SMA such that, if the first port of the HCA is unable to receive a subnet management packet (SMP) from a subnet manager (SM) via a leaf switch connected directly to the first port,
the SMA receives the SMP from the SM via the second port of the HCA, and
the SMA updates the first port state of the first port in response to the SMP; and
providing a second proxy function with said SMA such that, if the leaf switch connected directly to the first port of the HCA enters an inactive state in which it is not possible to change one or more states associated with said leaf switch via an in-band management interface,
the SMA receives an SMP from the SM via the second port of the HCA, and
the SMA updates said one or more states of said leaf switch in response to the SMP.

10. The method according to claim 9, further comprising:
detecting the leaf switch connected directly to the first port of the HCA entering an inactive state.

11. The method according to claim 9, further comprising:
allowing a local watchdog logic component to be used to recover the leaf switch connected directly to the first port.

12. The method according to claim 9, wherein:
updating said first port state of the first port in response to the SMP comprises one of updating a management key and resetting a link at the first port on the HCA.

13. The method according to claim 9, further comprising:
updating, via a subnet manager, the fabric with a new management key, which replaces an old management key that was associated with the fabric before a leaf switch connected to a port is lost.

14. The method according to claim 13, further comprising:
performing, via the subnet manager, fencing operations for the first port against a lost leaf switch via the second port in order to
prevent the lost leaf switch from trying to perform subnet operation and/or management tasks that represents stale subnet policy using the old management key, and
prevent the first port from communicating according to stale subnet policy.

15. The method according to claim 14, further comprising:
using, via the subnet manager, the SMA on the HCA to update the first port with the new management key.

16. The method according to claim 9, further comprising:
carrying out an SMP based fence operation on a remote HCA port, wherein the SMP based fence operation includes one of updating the M_Key associated with the remote HCA port as well as resetting a link associated with the remote HCA port, and
allowing the SMA to implement full SMA features set on behalf of any of the plurality of ports of the HCA in which said SMA is embedded, wherein the ability to perform any SMA operation allows the SM to configure another HCA port according to a current fabric policy without any dependency on direct IB access to the another HCA port.

17. The method according to claim 9, further comprising:
ensuring, via the HCA, that SMA operations via one HCA port on behalf of another HCA port are only allowed when both ports are controlled by a same subnet manager, which is assured by requiring at least one of that both ports are set up with a same M_Key value and that the M_Key value for each port is specified in each operation request.

18. A non-transitory machine readable storage medium having instructions stored thereon that when executed cause a system to perform the steps of:
providing a host channel adapter (HCA) having an embedded firmware and a plurality of ports, including at least a first port having a first port state and a second port having a second port state, wherein each of the plurality of ports is connected to a different leaf switch;
providing a secure subnet management agent (SMA) implemented in the embedded firmware of the HCA;
providing a first proxy function with said SMA such that, if the first port of the HCA is unable to receive a subnet management packet (SMP) from a subnet manager (SM) via a leaf switch connected directly to the first port,
the SMA receives the SMP from the SM via the second port of the HCA, and
the SMA updates the first port state of the first port in response to the SMP; and
providing a second proxy function with said SMA such that, if the leaf switch connected directly to the first port of the HCA enters an inactive state in which it is not possible to change one or more states associated with said leaf switch via an in-band management interface,
the SMA receives an SMP from the SM via the second port of the HCA, and
the SMA updates said one or more states of said leaf switch in response to the SMP.

* * * * *